(No Model.)
O. TOWER.
THILL COUPLING.
No. 293,379. Patented Feb. 12, 1884.
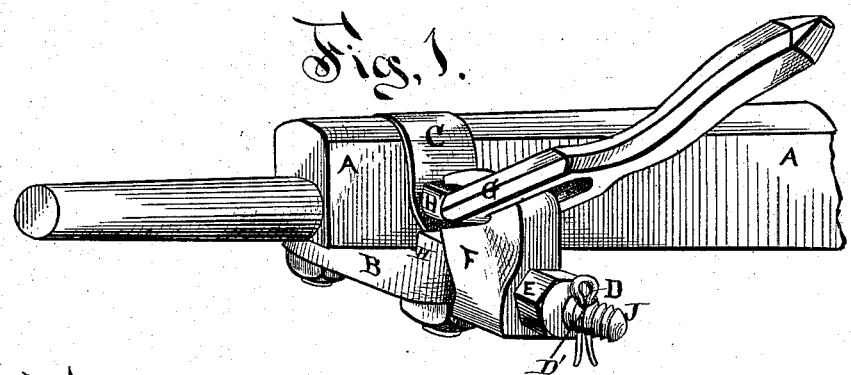
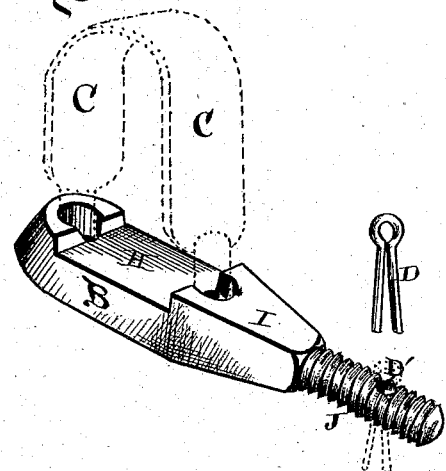
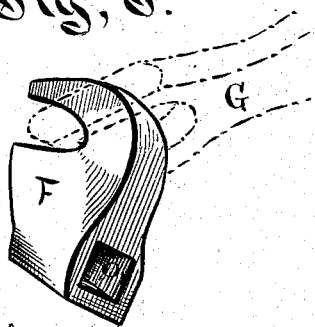
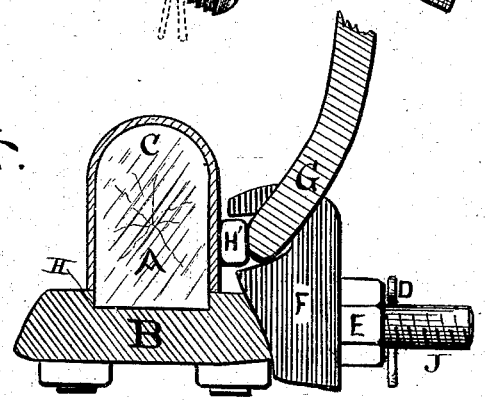
WITNESSES:
Frank Martin
Albert C. Johnson
INVENTOR.
Oscar Tower

UNITED STATES PATENT OFFICE.

OSCAR TOWER, OF WILSON, NEW YORK, ASSIGNOR OF ONE-HALF TO HENRY M. DAVIS, OF SAME PLACE.

THILL-COUPLING.

SPECIFICATION forming part of Letters Patent No. 293,379, dated February 12, 1884.

Application filed August 22, 1883. (No model.)

*To all whom it may concern:*

Be it known that I, OSCAR TOWER, of Wilson, Niagara county, New York, have invented certain new and useful Improvements in Thill-Couplings, of which the following is a description.

My invention relates to an improvement in thill-couplings; and it consists in the combination of the axle, the clip, and a recessed block, which is secured to the axle by means of the clip, and which has a conical portion to receive the coupling, and a screw-threaded portion to receive the nut, with the coupling, the clamping-nut, and a pin to keep the nut in place, all of which will be more fully described hereinafter.

Figure 1 is a perspective of my invention complete. Fig. 2 is a similar view of the block and pin. Fig. 3 is a perspective of the coupling. Fig. 4 is a side elevation of my invention.

A represents the axle, B the coupling-block, and C the clip. The block B has a recess, H, formed in its top, so as to receive the lower edge of the axle therein, in order to prevent the block from having any endwise motion, and to enable it to be secured more rigidly to the axle than could otherwise be done. The lower ends of the clip pass down through the block and clamp it against the under side of the axle, as shown. That portion, I, of the block which extends beyond the front of the axle is made tapering, so as to prevent any tendency on the part of the coupling F to work loose, and to enable the coupling to be more rigidly held than could be done upon a straight portion. The coupling F, of the form shown, is passed over the screw-threaded portion J upon the tapering portion I, and is then rigidly clamped in place, after the thill-iron G has been passed down over its top, by the nut E upon the screw-threaded portion J. After the thill-iron is placed in position, the piece of rubber H' is placed behind it, and then the nut is screwed up in place. The opening O through the lower part of the block is also made tapering, so as to conform to the shape of the tapering portion I of the block, and so that the block can be fed forward until it is rigidly held in place. Through the screw-threaded portion J of the block B is made a vertical hole, D', through which the pin D is passed, for the purpose of preventing the nut E from working loose.

Having thus described my invention, I claim—

In a thill-coupling, the combination of the axle, clip, block B, having the tapering portion I, screw-threaded portion J, and hole D', with the coupling F, nut E, and pin D, the parts being combined and arranged to operate substantially as shown.

Dated August 18, 1883.

OSCAR TOWER.

In presence of—
FRANK MARTIN,
ALBERT C. JOHNSON.